United States Patent
Keafer, Jr. et al.

4,062,996
Dec. 13, 1977

[54] TRANSMITTING AND REFLECTING DIFFUSER

[75] Inventors: Lloyd S. Keafer, Jr., Yorktown; Ernest E. Burcher; Leonard P. Kopia, both of Newport News, all of Va.

[73] Assignee: The United States of America as represented by the Administrator of the National Aeronautics and Space Administration, Washington, D.C.

[21] Appl. No.: 370,999

[22] Filed: June 18, 1973

Related U.S. Application Data

[60] Division of Ser. No. 239,803, March 30, 1970, Pat. No. 3,779,788, and a continuation-in-part of Ser. No. 38,816, May 19, 1970, abandoned.

[51] Int. Cl.$^2$ .................. G02B 13/14; B32B 19/00
[52] U.S. Cl. ........................ 428/334; 428/336; 428/426; 428/428; 350/1
[58] Field of Search .......... 117/106 R, 33.3, 169 A; 350/1, 311; 65/32, 33; 427/162, 166, 167, 248 R, 255; 428/426, 428, 334–336

[56] References Cited

U.S. PATENT DOCUMENTS

| 1,794,557 | 3/1931 | Symonds | 350/1 |
| 1,813,521 | 7/1931 | Wolfe | 350/1 |
| 3,486,870 | 12/1969 | Vervaart et al. | 65/32 |
| 3,779,788 | 12/1973 | Keafer et al. | 117/33.3 |

OTHER PUBLICATIONS

Kirk–Othmer, "Encyclopedia of Chemical Technology," vol. 18, pp. 75 and 97, 1969.
Electronics, Feb. 21, 1966, vol. 39, No. 4, p. 216.

*Primary Examiner*—Harris A. Pitlick
*Attorney, Agent, or Firm*—Howard J. Osborn; John R. Manning

[57] ABSTRACT

An ultraviolet grade fused silica substrate is coated with vaporized fused silica. The coating thickness is controlled, one thickness causing ultraviolet light to diffuse and another thickness causing ultraviolet light to reflect a near Lambertian pattern.

3 Claims, 5 Drawing Figures

TRANSMITTING AND REFLECTING DIFFUSER

ORIGIN OF THE INVENTION

This invention was made by employees of the National Aeronautics and Space Administration and may be manufactured and used by or for the Government for governmental purposes without the payment of any royalties thereon or therefor.

Divisional

This application is a continuation-in-part of application Ser. No. 38,816, filed May 19, 1970, entitled TRANSMITTING AND REFLECTING DIFFUSER, and a division of application Ser. No. 239,803, filed Mar. 30, 1972, now Pat. No. 3,779,788 having the same title.

BACKGROUND OF THE INVENTION

This invention relates to the diffusion of ultraviolet light and relates in particular to a method of contructing a near-Lambertian diffuser for transmittance and reflectance of ultraviolet light. A Lambertian diffuser is one which diffuses a point (concentrated beam) source of reflected or transmitted light in a cosine law or circular pattern.

Lambertian diffusers are useful in calibrating instrumentation in the laboratory and for use in optical equipment. The subject invention was first used in the calibration of an optical radiometer.

Although opal glass serves as a near-Lambertian diffuser of visible light, no comparable prior art diffuser has been developed for use in the 2000–4000 A ultraviolet range. Absorption in the diffusing layer or scattering out the edge of the diffuser causes the diffusion pattern to deviate from Lambertian. When a thinner diffusing layer is used in an attempt to avoid absorption, a large specular or unscattered component of the ultraviolet light develops causing deviation from Lambertian.

SUMMARY OF THE INVENTION

The present embodiment of the invention was constructed by vaporizing and condensing ultraviolet grade fused silica in a thin, even layer upon an ultraviolet grade fused silica substrate. The device transmitted a near-Lambertian diffusion pattern of ultraviolet light when the coating thickness was kept thin, a thickness of 20 $\mu$ producing optimum results. The device also reflected diffused ultraviolet light in a near-Lambertian pattern for coating thicknesses greater than 100 $\mu$. The thin coating for the transmittance diffuser was vitrified with a flame to increase durability. For the influence diffuser, metal substrates produced equally good results.

Accordingly, it is an object of the invention to produce a near-Lambertian diffuser of light in the 2000–4000 A ultraviolet range.

Another object of the invention is to produce a near-Lambertian diffuser for transmittance of ultraviolet light which gives a diffusion pattern superior to that of opal glass in the visible range.

A further object of the invention is to produce a near-Lambertian diffuser for reflectance of ultraviolet light which is superior to the reflectance of magnesium carbonate and magnesium oxide in the ultraviolet range.

An additional object of the invention is to produce a near-Lambertian diffuser of ultraviolet light which can be simply and cheaply produced in a variety of sizes and shapes.

BRIEF DESCRIPTION OF THE DRAWINGS

A more complete appreciation of the invention and many of the attendant advantages will be better understood by reference to the following detailed description when considered in connection with the accompanying drawings, wherein.

DESCRIPTION OF THE EMBODIMENT

Figure 1:
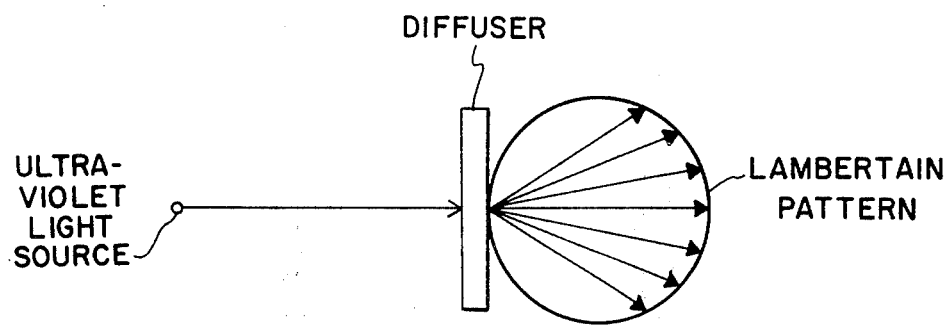
FIG. 1 is a schematic representation of a Lambertian transmitting diffuser in the ultraviolet range, wherein a point (beam) source of ultraviolet light is transmitted and diffused in a circular pattern.
Figure 2:
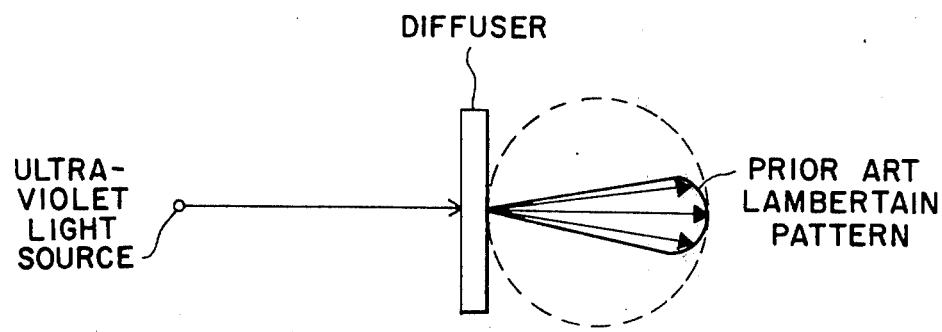
FIG. 2 is a schematic of a diffusion pattern typical of the prior art ultraviolet diffuser with a high specular or nonscattered component.

Referring now more particularly to the drawings, FIG. 1 is a schematic representation of a true Lambertian diffusion of transmitted ultraviolet light. The present invention very nearly obtains this circular diffusion pattern as opposed to the prior art shown in FIG. 2.

Figure 3:
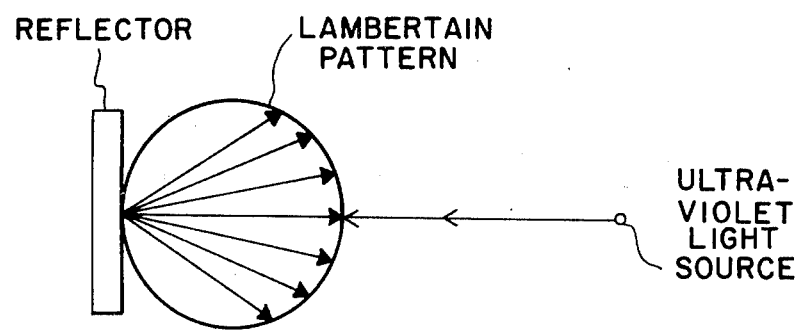
FIG. 3 is a schematic representation of a Lambertian diffuser of reflected ultraviolet light.
Figure 4:
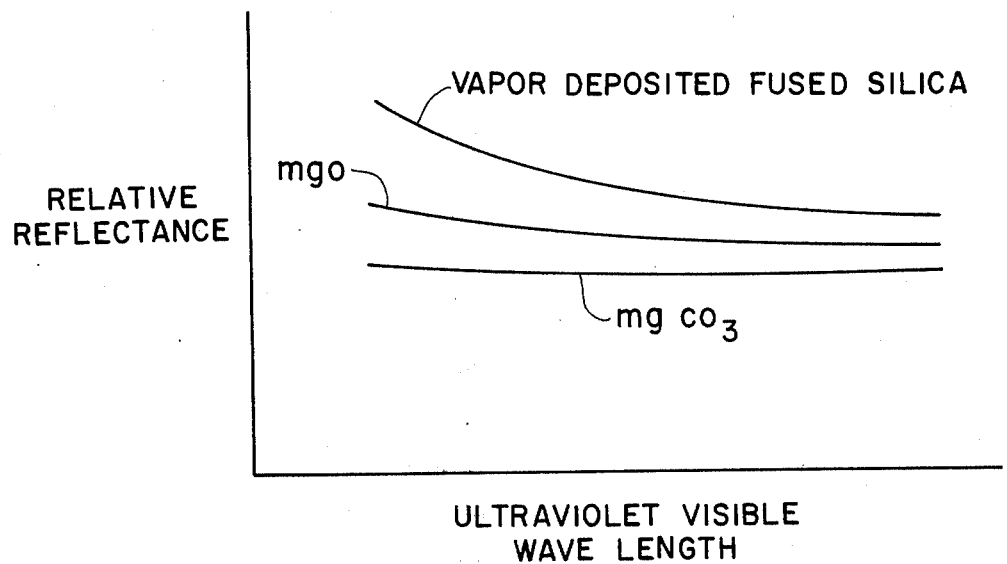
FIG. 4 is a graphic representation comparing the relative reflectance of ultraviolet light by the present invention with that of magnesium oxide and magnesium carbonate.

FIG. 3 is a schematic representation of a true Lambertian diffuser of reflected ultraviolet light. In very nearly achieving this pattern, the present invention has a greater relative reflectance in the ultraviolet range than standard reflectors as shown in FIG. 4.

Figure 5:
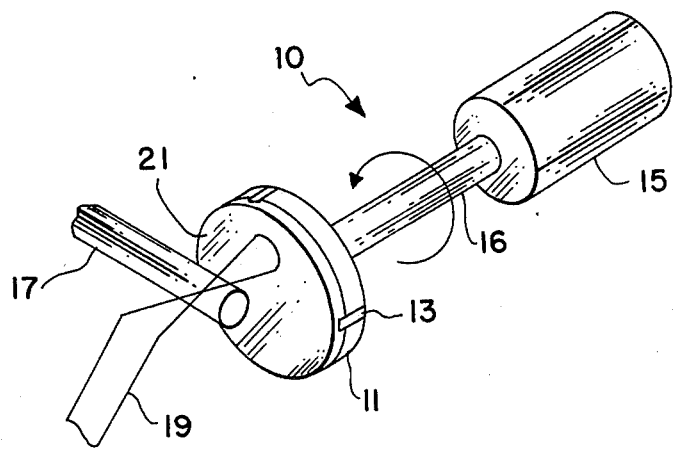
FIG. 5 is a representation of the apparatus and arrangement used to produce the invention, a near-Lambertian diffuser of ultraviolet light.

The apparatus used in constructing the novel diffuser is shown in FIG. 5 and designated generally by the reference numeral 10. An ultraviolet grade substrate 11, constructed of any material capable of condensing vaporized fused silica upon its surface and adhering to the condensate is fixed to the shaft 16 of an electric motor 15 by means of a holder 13. The primary functions of substrate 11 are to provide a condensing surface for the vaporized fused silica and mechanical support for the resulting coating; however, in the case of a diffuser of transmitted light, substrate 11 must in addition be capable of transmitting ultraviolet light to the diffusing coating. The holder 13 is of conventional design and need not be described in detail. The substrate is so held that the flat surface 21 to be coated is perpendicular to the axis of rotation and facing away from the motor 15. An ultraviolet grade fused silica rod 17 is mounted parallel to the surface to be coated, the axis of the rod passing through the axis of rotation of the substrate. An oxyacetylene torch 19 is moved back and forth along the rod 17 at a rate calculated to vaporize the fused silica rod 17 so that the vaporized silica is deposited evenly upon the rotating substrate 11 as it condenses. The vaporized fused silica is condensed on the surface of substrate 11 in microscopic particles varying in size from approximately 10 to 10,000A, thus forming a diffusive coating. Rod 17 is held at a constant distance from the rotating substrate. This distance is fixed according to the nozzle size and gas pressure of torch 19. Although the method of vaporizing the silica rod by an oxy-acetylene torch is the preferred method of vaporization, it is to be understood that other means of vaporization can be utilized such as induction heating in an inert gas and the use of an infrared laser of the $CO_2$ type.

To produce a near-Lambertian diffuser for transmitting ultraviolet light an ultraviolet grade substrate 11, constructed preferably of fused silica or other workable material capable of transmitting ultraviolet light, is used and the coating thickness is kept to less than 100 $\mu$. An optimum coating thickness was found to be 20 $\mu$ with greater thicknesses excessively degrading transmittance and lesser thicknesses adversely affecting diffusion. At the 20 $\mu$ coating thickness, the diffusion pattern of light in the ultraviolet range was very nearly Lambertian. The 20 $\mu$ coating thickness has an average specular transmittance of 0.33% between 2000 and 4000 A and a totally diffuse transmittance of 1% in that range. The coating of the transmitting diffuser may be vitrified to increase durability by playing the flame of torch 19 over the coating until the surface appears slightly glassy.

To produce a near-Lambertian diffuser for reflecting ultraviolet light, any workable metal or solid material may be used as the substrate 11 and the coating thickness is at least 100 $\mu$. The coating of the reflecting diffuser is usually not vitrified.

The device was tested throughout the wavelength range of 2000–4000A. A standard monochromator was used as the source. A photomultiplier tube having an S-5 response was used in detecting the boundaries of the diffusion pattern. The detector was movably mounted so as to be positioned within a 140° arc, 70° either side of the projected ultraviolet light line. A second monochromator was used to analyze the ultraviolet light after diffusion but no fluorescing by the diffuser was noted.

A relative specular transmitter of 0.33% was measured by a spectrophotometer. Total diffuse transmittance was obtained by multiplying this value by $\pi$, the diffusion pattern being very nearly Lambertian. Reflectance was also measured with a spectrophotometer for comparison with standard reflectors in the ultraviolet range.

Slow scan, high sensitivity x-ray diffraction tests revealed that the deposited material was non-crystalline. Electron photomicrographs of the condensate revealed a distribution in particle size from 10 A to about 10,000 A with a peak near 500 A. The excellent diffusion properties of the condensate are believed related to the structure of the material and particle size.

As an alternate embodiment of this invention, it may be possible to use another type of transmitter of ultraviolet light such as sapphire as a substrate for the transmitting diffuser. Other combinations and modifications are believed possible and are not to be excluded by this teaching. It is therefore to be understood that within the scope of the appended claims, the invention may be practiced otherwise than as specifically described.

What is claimed as new and desired to be secured by Letters Patent of the United States is:

1. A diffuser for producing an ultraviolet near Lambertian pattern comprising:
    a substrate; and
    a diffusive coating condensed from a separate piece of fused silica evenly covering said substrate and having a sufficient thickness for producing an ultraviolet near Lambertian pattern.

2. A diffuser for producing an ultraviolet near Lambertian pattern as in claim 1 wherein the thickness of said diffusive coating is at least 100 $\mu$ resulting in reflective diffusion of ultraviolet near Lambertian pattern.

3. A diffuser for producing an ultraviolet near Lambertian pattern as in claim 1 wherein the thickness of said diffusive coating is approximately 20 $\mu$ resulting in transmissive diffusion of ultraviolet near Lambertian pattern.

* * * * *